United States Patent [19]
McLellan

[11] 4,129,829
[45] Dec. 12, 1978

[54] CHRONOGRAPH

[76] Inventor: Norvel J. McLellan, 1002 N. Main, Pleasanton, Tex. 78064

[21] Appl. No.: 825,769

[22] Filed: Aug. 18, 1977

[51] Int. Cl.² .............................................. G01P 3/66
[52] U.S. Cl. ...................................... 324/178; 73/167; 246/182 A; 340/309.4; 346/38; 250/222 R; 324/189
[58] Field of Search .................. 324/178, 189; 73/167; 250/222 R, 209; 180/98, 105 E; 246/182 A, 187 B; 340/309.4; 346/38

[56] References Cited

U.S. PATENT DOCUMENTS

| | | | |
|---|---|---|---|
| 2,294,730 | 9/1942 | Eggers | 324/178 |
| 2,729,288 | 1/1956 | Malott | 324/178 X |
| 2,787,738 | 4/1957 | Hisle | 324/178 X |
| 3,184,678 | 5/1965 | Roth | 324/178 |
| 3,567,951 | 3/1971 | Montgomery, Jr. et al. | 324/178 X |
| 3,675,030 | 7/1972 | Tanenhaus | 324/178 X |

*Primary Examiner*—Stanely T. Krawczewicz
*Attorney, Agent, or Firm*—Gunn & Lee

[57] ABSTRACT

An apparatus for measuring velocity of a bullet is shown. A portable clamping device securely holds the barrel of a gun in position during firing. A bullet fired from the gun is projected through two openings located a predetermined distance apart from the end of the gun barrel. The bullet passing through the first opening activates a timing circuit to start current flow through a measuring device. The bullet passing through the second opening stops the current flow through the measuring device. The measuring devices gives an output indication that is indirectly proportionate to velocity of the bullet with units indicating the speed of the bullet. The measuring device may be a ballistic meter with no return springs on a meter movement to remain in its maximum position after measuring current flow therethrough.

12 Claims, 8 Drawing Figures

CHRONOGRAPH

BACKGROUND OF THE INVENTION

This invention relates to a chronograph and, more particularly, to an apparatus having a means for electronically determining the speed of a bullet. The bullet operates a first switch to start current flow and, after traveling a predetermined distance, a second switch to stop current flow. The current flow is measured by an appropriate measuring device.

BRIEF DESCRIPTION OF THE PRIOR ART

Prior to the present invention, many different types of chronographs were designed and used to measure the velocity of projectiles. Some of the early chronographs were mechanical and very clumsy to use, plus being expensive to manufacture. However, with electronic circuits becoming more economical, many different types of electronic chronographs have been devised. For example, Oehler (U.S. Pat. No. 3,824,463) shows a device wherein a bullet is fired through two coils spaced a predetermined distance apart. By a rather complicated electronic circuit using a high frequency oscillator, and digitally counting the number of cycles between a start pulse generated by the bullet passing through a first coil and a stop pulse generated by the bullet passing through a second coil, a counter and digital display then indicates the speed of the bullet passing through the coils. Such an apparatus as shown in Oehler is very expensive to manufacture and requires numerous electronic components.

Other types of somewhat less complicated chronographs have been used, but either have problems of accuracy or being expensive to manufacture. Other typical chronograph patents are as follows:

| INVENTOR | U.S. PAT. NO. |
|---|---|
| Slaght, et al. | 3,792,354 |
| Meyer, et al. | 3,222,596 |
| Clark | 3,230,450 |
| Sims, et al. | 3,215,932 |
| Tobey | 3,378,766 |

All of the prior patents have numerous problems with accuracy being one of the leading problems. For example, if a meter movement is being operated off of the charge of a capacitor, which capacitor is charged during the time interval that the bullet operates a first switch and travels a predetermined distance to operate a second switch, the meter would discharge the capacitor very quickly with the indicating dial rapidly returning to the zero position. In fact, the meter movement may not reach the point of maximum movement before the capacitor is discharged, thereby giving a false reading as to the speed of the bullet. Attempts have been made to hold the charge on the capacitor by using high gain amplifiers and large time constants for discharge of the capacitor.

Also many of the prior circuits are high sensitive to temperature and can only be used between a very narrow temperature range to give at best a rough estimation of the speed of the bullet.

SUMMARY OF THE INVENTION

It is an object of the present invention to provide a chronograph for accurately measuring the velocity of a projectile.

It is another object of the present invention to provide a chronograph that is simple and economic to manufacture, yet has a high degree of accuracy to determine the speed of the bullet over a wide range of temperatures.

It is yet another object of the present invention to provide a chronograph that may be used indoors as well as outdoors to measure the velocity of a bullet. The barrel of the gun is mounted in a pair of chunk clamps and fired through a pair of switch mounting plates located a predetermined distance apart. Passage of the bullet through a first of the switch mounting plates operates a first switch to allow current flow through a control circuit. Passage of the bullet through the second of the switch mounting plates operates a second switch to stop the current flow through the control circuit. By measuring the current flow, the speed of the bullet can be accurately determined. The amount of current flow may be measured directly, and maintained by a ballistic meter. Temperature compensation can be provided by compensating diodes.

Alternative embodiments include silicon control rectifiers used to drive a ballistic meter during the time interval that it takes the bullet to travel from the first switch mounting plate to the second switch mounting plate for operation of the respective switches thereon.

As a further alternative, upon opening the first switch, a capacitor is charged with the charging being stopped upon the opening of the second switch. By a variable resistor having an indicating scale attached thereto, which variable resistor provides the biasing voltage for a directly coupled second transistor, upon the voltage of the potentiometer reaching the voltage of the capacitor, current will flow through the transistors thereby giving an indication, such as light from a lamp or light emitting diode, to show the potentiometer is now indicating the velocity of the bullet.

As another alternative embodiment, a capacitor is charged between the opening of a first switch and a second switch. The charge on the capacitor operates a Darlington amplifier which drives a standard meter to indicate velocity of the projectile. Temperature compensating diodes are included for stability over a wide range of temperatures. An incandescent pilot light may also be used for ballast in regulating the circuit.

The chuck portion of the mounting structure may be a rotatable camming device with at least three radially moveable arms clamping on the gun barrel pursuant to the rotation of the cam. The cam is rotated in one direction to clamp onto the gun barrel, and in the opposite direction to release the gun barrel.

DESCRIPTION OF THE PREFERRED EMBODIMENT

Figure 1:
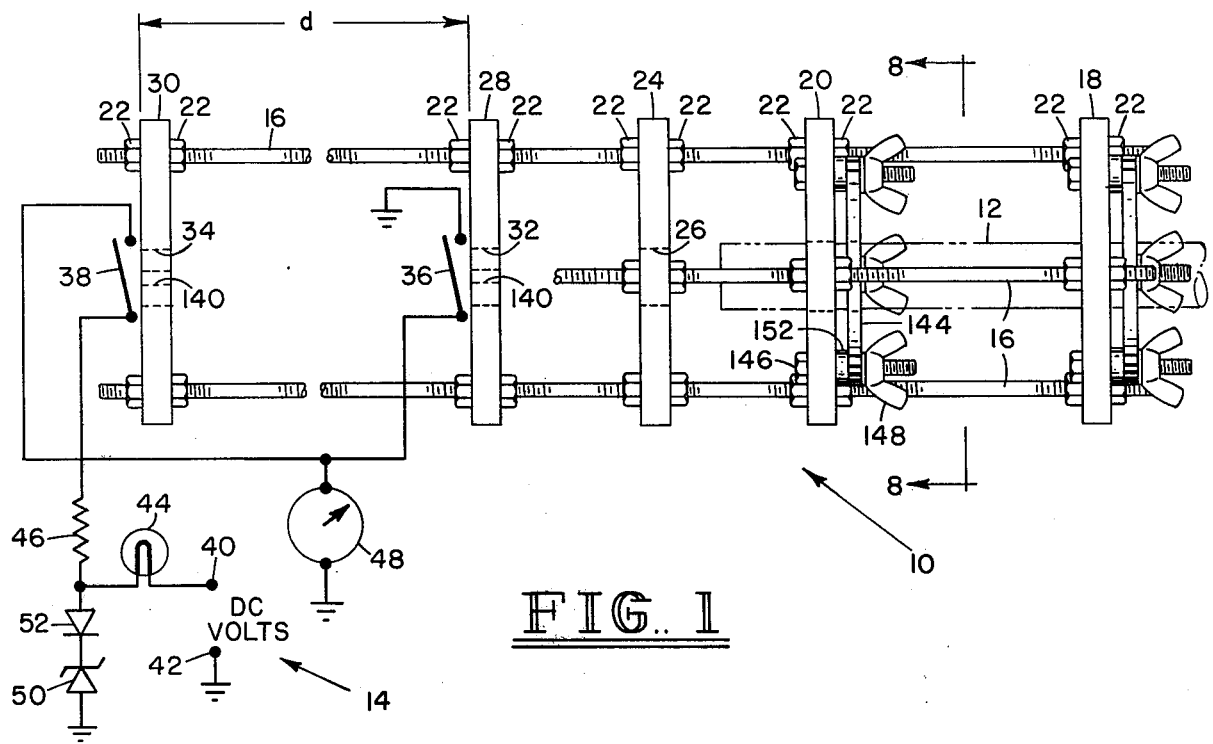
FIG. 1 is a pictorial representation of a gun barrel being clamped by chuck clamps of a mounting structure and with a preferred embodiment of a chronograph circuit being schematically shown.
Figure 8:
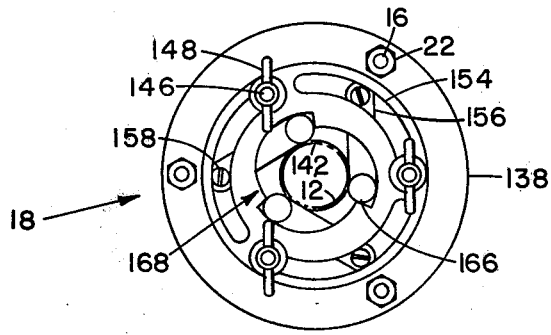
FIG. 8 is an end view of the mounting structure shown in FIG. 1.

Referring to FIG. 1 of the drawings, there is shown a mounting structure represented generally by the reference numeral 10, which mounting structure may receive a barrel 12 of a gun therein to securely hold the barrel 12 in position. Also shown in FIG. 1 is a first chronograph circuit 14 used to measure the speed of a bullet fired from barrel 12.

The mounting structure 10 includes a plurality of threaded rods 16. Each of the threaded rods 16 securely holds a first chuck clamp 18 and a second chuck clamp 20 in position by nuts 22. Chuck clamps 18 and 20 are spaced a distance apart with the distance being dependent upon the length of the barrel 12. At the end of the barrel 12 is a pressure baffle 24 again held in position by nuts 22 on threaded rods 16. The pressure baffle 24 has an opening 26 in the center thereof to allow a bullet fired from barrel 12 to pass therethrough. The pressure baffle 24 deflects most of the pressurized gas expelled from the end of barrel 12 upon the firing of a bullet therefrom.

Also mounted on the threaded rods 16 by nuts 22 is first switch mounting plate 28 and second switch mounting plate 30. Switch mounting plates 28 and 30 have openings 32 and 34, respectively, in the centers thereof. The openings 32 and 34 allow a bullet projected from barrel 12 to pass therethrough. The distance between the first switch mounting plate 28 and the second switch mounting plate 30 is accurately set to a predetermined distance d.

Located across a forward space of opening 32 is a normally closed (NC) start switch 36, and located across opening 34 is a normally closed (NC) stop switch 38. A DC voltage is fed across input terminals 40 and 42. Connected to input terminal 40 is an incandescent lamp 44 which connects in series with limiting resistor 46, stop switch 38, and start switch 36 to ground. Also connected between the interconnection of start switch 36 and stop switch 38 and ground is a ballistic meter 48. Connected between ground and the interconnection of limiting resistor 46 and incandescent lamp 44 is a zener diode 50 and a temperature compensating diode 52.

When a bullet fired from barrel 12 opens start switch 36, the short across ballistic meter 48 is removed and current from the DC volts will flow through incandescent lamp 44, limiting resistor 46, stop switch 38 and ballistic meter 48. The value of the limiting resistor 46 is determined by the rating of the ballistic meter 48 and the range of velocities of bullets that are being checked. The ballistic meter 48 will read in relationship to the amount of current that has passed therethrough. The scale on the ballistic meter 48 is graduated in units of velocity. In a ballistic meter, such as ballistic meter 48, there is no return force acting against the meter movement, such as return springs. After each reading, the ballistic meter 48 must be manually reset.

As the bullet passes stop switch 38, stop switch 38 will open thereby stopping meter movement of ballistic meter 48. Start switch 36 and stop switch 38 may be break wire type of switches wherein the bullet would simply break a wire symbolized by start switch 36 and stop switch 38. The compensating diode 52 is used to improve accuracy because it counteracts variations in the breakdown voltage of the zener diode 50 in response to temperature changes. If the DC volts connected to input terminals 40 and 42 is less than approximately 15 volts, it may be better to replace compensating diode 52 with a zener diode.

The incandescent lamp 44 serves as a pilot light and as a limiter for the zener diode 50. In case the DC volts is supplied by a battery, the incandescent lamp 44 serves as an indicator of battery condition. Further, because the incandescent lamp 44 has a direct relationship between temperature and resistance, it may help extend battery life.

Figure 2:
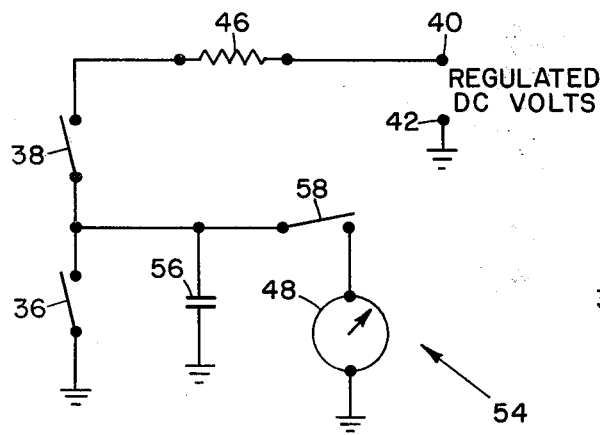
FIG. 2 is a second embodiment of the chronograph circuit.

Referring now to FIG. 2 of the drawings, there is shown a second chronograph circuit 54. Numbers previously used to indicate like components will again be used in the description of FIG. 2 hereinbelow. A regulated DC voltage is connected across input terminals 40 and 42. Current is normally flowing from input terminal 40 through limiting resistor 46, stop switch 38 and start switch 36 to ground. Upon opening start switch 36 by the passage of a bullet therethrough, capacitor 56 will begin to charge. Charging of capacitor 56 is stopped upon the opening of stop switch 38 by the passage of the bullet therethrough. Thereafter, by closing normally open meter switch 58, the charge of capacitor 56 will flow through ballistic meter 48 to ground thereby giving a reading of bullet velocity on the ballistic meter 48. Some of the lower priced ballistic meters operate better off of the charge of a capacitor than from current flowing directly therethrough as would otherwise be controlled by the opening of start switch 36 and stop switch 38.

Figure 3:
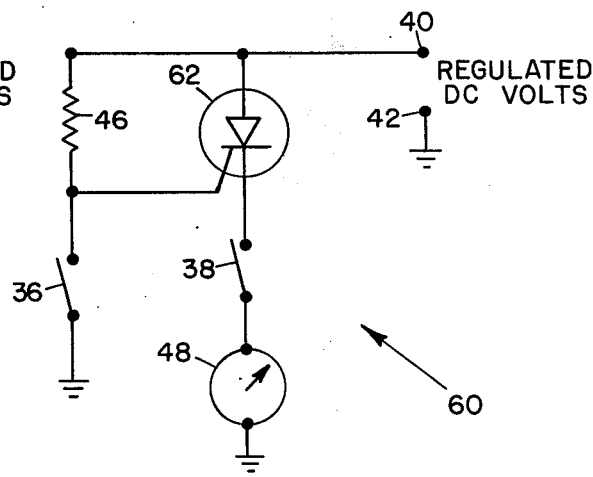
FIG. 3 is a third embodiment of the chronograph circuit.

Referring to FIG. 3, there is shown a third chronograph circuit 60 wherein like numerals will again represent like components previously described hereinabove. The regulated DC voltage is connected to input terminals 40 and 42. Current flows from terminal 40 through limiting resistor 46 and start switch 36 to ground. When the bullet opens start switch 36, the ground from the gate of silicon control rectifier (SCR) 62 is removed. The removal of the ground from the gate causes SCR 62 to turn ON with current flowing from input terminal 40 through SCR 62, stop switch 38 and ballistic meter 48 to ground. When the bullet opens stop switch 38, current will stop flowing through ballistic meter 48. Ballistic meter 48 will read in relationship to the time it takes the bullet to pass from start switch 36 to stop switch 38. The third chronograph circuit 60 is particularly suited for cheaper type iron vane ballistic meters 48. The third chronograph circuit 60 will conserve power because the only time of significant current flow is the period of time that it takes the bullet to move from start switch 36 to stop switch 38.

Figure 4:
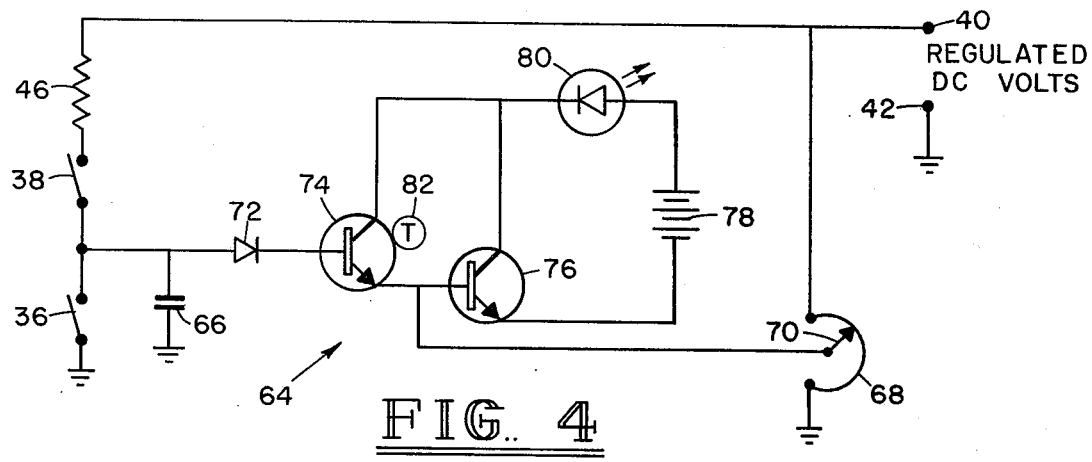
FIG. 4 is a fourth embodiment of the chronograph circuit.

Referring now to FIG. 4 of the drawings, there is shown a fourth chronograph circuit 64 wherein the same numerals will be used to designate like components as previously described hereinabove. A regulated DC voltage is connected across input terminals 40 and 42. Prior to the firing of the bullet, current will flow from input terminal 40 through limiting resistor 46, stop switch 38 and start switch 36 to ground. Upon the bullet opening start switch 36, current will flow through capacitor 66 to ground. Charging of capacitor 66 is determined by the RC time constant of limiting resistor 46 and capacitor 66. When the bullet opens stop switch 38, charging of capacitor 66 will be stopped. Also connected between input terminal 40 and ground is potentiometer 68 having a wiper arm 70. The wiper arm 70 is normally positioned at the high voltage side of the potentiometer 68. Connecting from the high voltage side of capacitor 66 to the base of transistor 74 is a blocking diode 72. The emitter output of transistor 74 connects to the base input of transistor 76. The emitter output of transistor 76 is series connected with battery 78 and light emitting diode 80 which connects to the collector of transistors 74 and 76.

The wiper arm 70 of the potentiometer 68 has a dial attached thereto calibrated in velocity units. By having the wiper arm 70 at the high voltage side of potentiometer 68, a reverse bias is applied to transistor 74. Therefore, even though capacitor 66 is charged, transistor 74 will not conduct. By adjusting wiper arm 70 to a lower voltage along potentiometer 68 until a reverse bias no longer exists, transistors 74 and 76 are turned ON and light emitting diode 80 will emit a visible light. At this point, the wiper arm 70 indicates the speed of the bullet. By use of the fourth chronograph circuit 64, a very accurate reading of the velocity can be obtained without the use of a high priced ballistic meter. The diode 72 also provides an additional function of preventing breakdown voltage from potentiometer 68 across transistor 74. The battery 78 supplies power for the light emitting diode 80.

As an additional feature of the fourth chronograph circuit 64, a thermometer 82 may be located immediately adjacent to transistors 74 and 76 to measure their respective temperatures. Also, the dial for wiper arm 70 may have an additional scale to indicate the correction factor for a given temperature varying from a predetermined operational temperature. By incorporating the correction factor with the velocity scale, a very accurate velocity measurement of the bullet can be obtained over a wide range of temperatures. A base unit of calibration can be at 20° C. Therefore, if the temperature at thermometer 82 is 20° C., no correction is necessary. A fair rule of approximation for silicon transistors is that a 5° C. change in temperature gives a 0.1 volt inverse change in turn ON volts.

Figure 5:
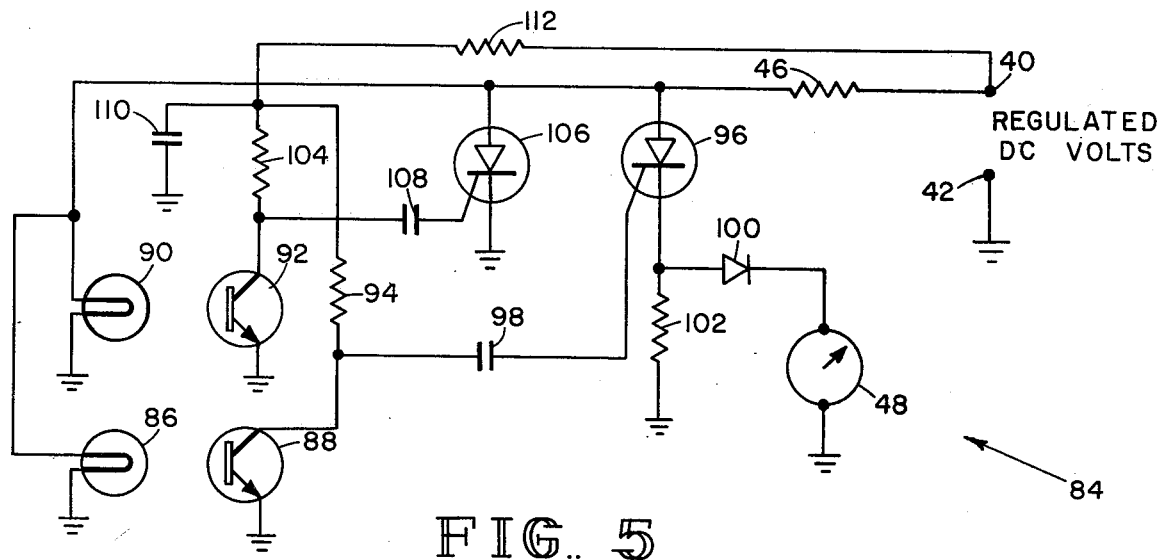
FIG. 5 is a fifth embodiment of the chronograph circuit.

Referring to FIG. 5, there is shown a fifth chronograph circuit 84 wherein the same numerals will be used to designate the same components as previously described hereinabove. The previously described start switch 36 has been replaced by lamp 86 and photosensitive transistor 88. Likewise, stop switch 38 has been replaced by lamp 90 and photosensitive transistor 92. As the bullet passes between lamp 86 and photosensitive transistor 88 (which would be mounted on opposite sides of opening 32 of first switch mounting plate 28), a shadow is cast on photosensitive transistor 88. This shadow causes current flowing through transistor 88 via load resistor 94 to stop. The stopping of current flow through photosensitive transistor 88 causes its collector to go high, thereby turning ON silicon control rectifier 96 through its gate circuit via coupling capacitor 98. The turning ON of SCR 96 causes current flow through ballistic meter 48 via biasing diode 100. Resistor 102 acts as a bleeder resistor for SCR 96.

As the bullet passes between lamp 90 and photosensitive transistor 92, conduction of photosensitive transistor 92 will stop terminating current flow through load resistor 104. Stopping of current flow through photosensitive transistor 92 supplies a gate voltage to silicon control rectifier 106 via coupling capacitor 108. The supplying of the gate voltage causes the conduction of SCR 106 thus supplying a ground to one side of limiting resistor 46. This stops current flow through SCR 96 and ballistic meter 48. Capacitor 110 and resistor 112 have a long time constant to prevent a false trigger of SCRs 96 and 106 upon turning ON the regulated DC voltage. The meter indication of ballistic meter 48 will indicate the velocity of the bullet traveling the distance d from first switch mounting plate 28 to the second switch mounting plate 30 on which lamps 86 and 90 and photosensitive transistors 88 and 92, respectively, are mounted across openings 32 and 34.

Figure 6:
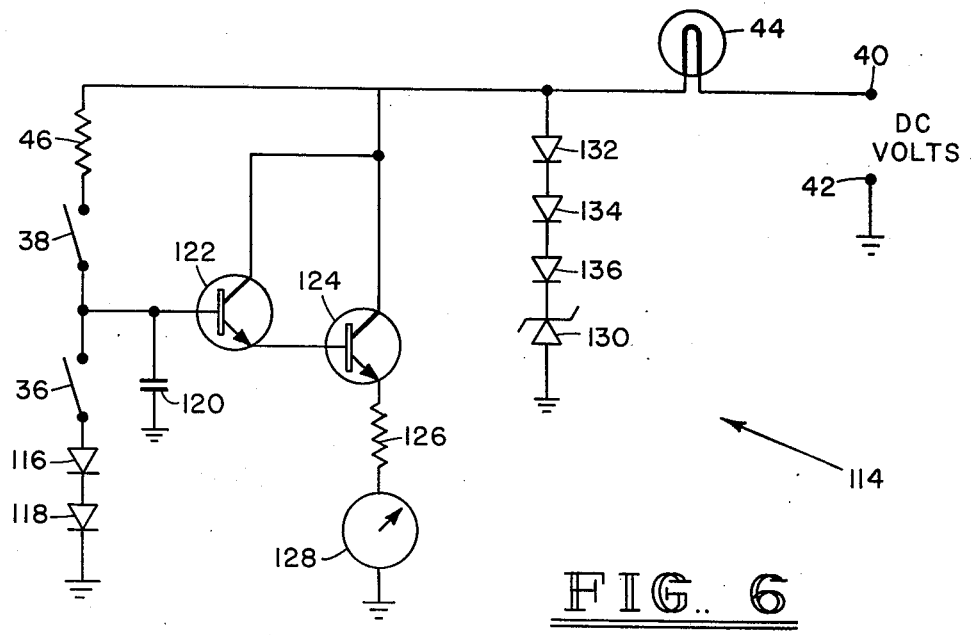
FIG. 6 is a sixth embodiment of the chronograph circuit.

Referring now to FIG. 6 of the drawings, there is shown a sixth chronograph circuit 114 wherein like numerals will be used to designate components previously described hereinabove. Again, a DC voltage is connected across input terminals 40 and 42. Current will flow through incandescent lamp 44, limiting resistor 46, stop switch 38, start switch 36 and diodes 116 and 118 to ground. When the bullet opens start switch 36, capacitor 120 will begin to charge. When the bullet opens stop switch 38, charging of capacitor 120 will be stopped. Capacitor 120 is connected to the input of Darlington connected transistors 122 and 124. Because of the very high input impedance of the Darlington connection of transistors 122 and 124, current flowing through limiting resistor 126 can be read on meter 128. Meter 128 is an ordinary meter calibrated in units of velocity. Because of the high input impedance of the Darlington connection, discharge of capacitor 120 will be very slow with a period of time being required before there is a noticeable change in the indication of meter 128. Limiting resistor 46 and capacitor 120 determine the RC time constant for charging capacitor 120.

Diode 116 is a compensating diode for transistor 122 to compensate for changes in turn ON voltage due to temperature changes. Likewise, diode 118 is a compensating diode for transistor 122 to compensate for changes in turn ON voltage due to temperature changes. Zener diode 130 provides a regulated voltage for an otherwise unregulated DC voltage input. In series connection with zener diode 130 are diodes 132, 134 and 136. Diodes 132 and 134 are compensating diodes that maintain the effective voltage at a constant level. For example, when the temperature goes up, the turn ON voltage of diodes 116 and 118 decreases. If the DC voltage input was fixed, the resulting steady state voltage across limiting resistor 46 would be increased. By using diodes 132 and 134, the drop in DC voltage input can be compensated inversely to the prior compensation of diodes 116 and 118. Diode 136 compensates for the variations in breakdown voltage of zener diode 130 due to variations in temperature. The incandescent lamp 44 acts as a ballast for voltage regulation. It should be realized that incandescent lamp 44, diodes 116, 118, 132, 134 and 136 are not essential to the operation of the sixth chronograph circuit 114, but they increase accuracy.

Figure 7:
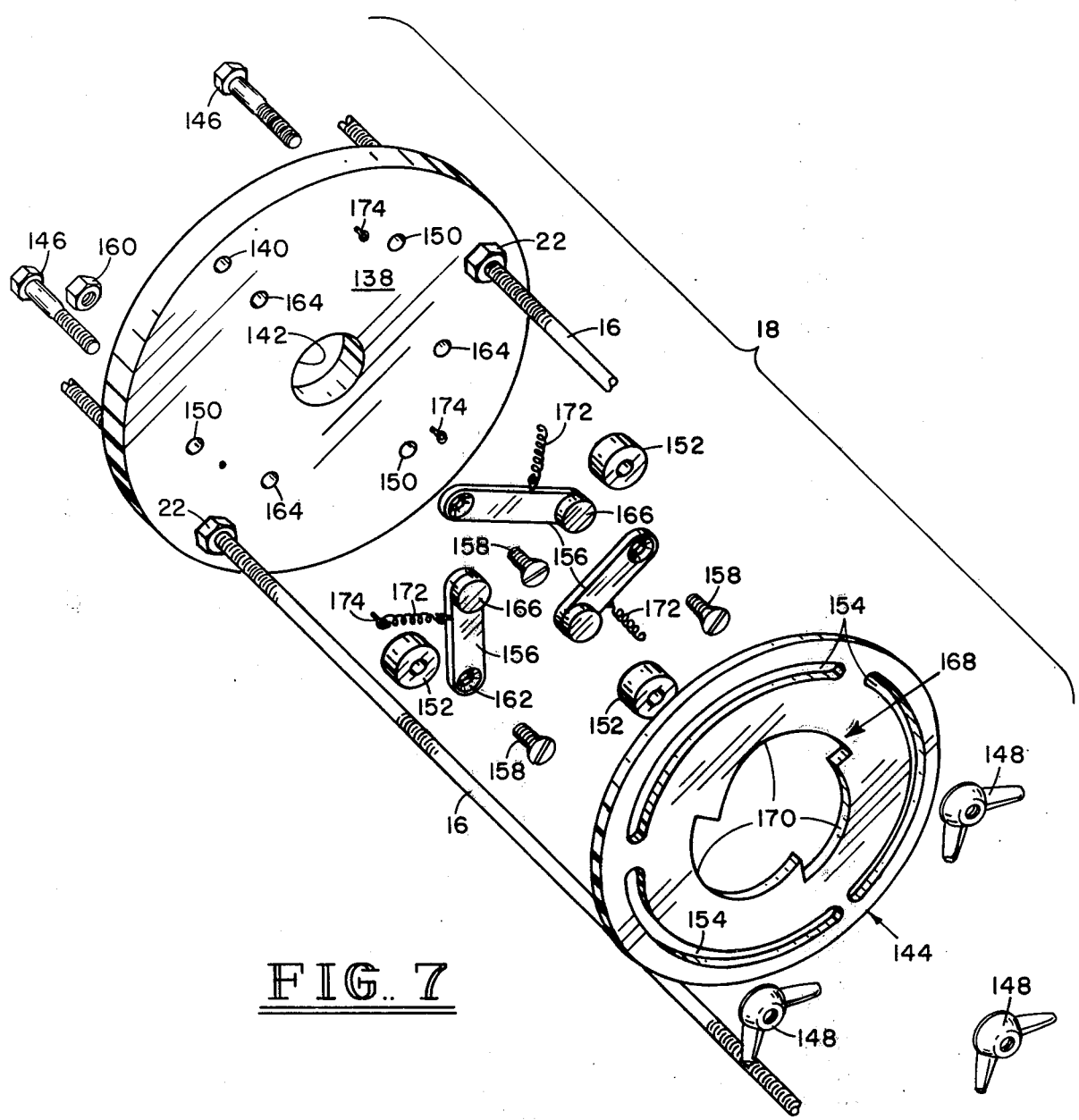
FIG. 7 is an exploded perspective view of one of the chuck clamps.

Referring to FIG. 7 of the drawings, an exploded perspective view of the first chuck clamp 18 is shown. It should be understood that the first chuck clamp 18 may be constructed identical to the second chuck clamp 20. A base plate 138 which is essentially wafer-shaped has a plurality of holes 140 in its outer perimeter for receiving threaded rods 16 therethrough. Opening 142 in the center of base plate 138 allows the barrel 12 of the gun to extend therethrough. A camming wafer 144, which has a cross-sectional diameter slightly less than the base plate 138, is connected to the base plate 138 by means of screws 146 and wing nuts 148. The screws 146 extend through intermediate holes 150, spacers 152 and arcuate slots 154 of camming wafer 144 to the wing nuts 148. Located in the space provided by spacers 152 is a plurality of camming arms 156 that are mounted on base plate 138 by means of flathead screws 158 and nuts 160. The flathead screws 158 extend through counter-sunk openings 162 of camming arms 156 and camming arm mounting hole 164. It should be realized that the flathead screws 158 are left slightly loose to allow for pivotal movement of the camming arms 156. On the opposite end of the camming arms 156 from counter-sunk openings 162 are raised circular camming surfaces 166 that are received in center opening 168 of camming wafer 144. Center opening 168 has a plurality of camming surfaces 170 for causing pivotal movement of the camming arms 156 via the raised circular camming surfaces 166.

To insert a barrel 12 in the first chuck clamp 18, which is securely held in position by nuts 22 on threaded rods 16, wing nuts 148 are loosened. Next, the camming wafer 144 is rotated on screws 146 via arcuate slots 154 until camming arms 156 have moved radially outward resulting from the force of tension spring 172 between each respective camming arm 156 and a respective anchor 174 located on base plate 138. The tension spring 172 causes the raised arcuate camming surfaces 166 to follow camming surfaces 170 of the camming wafer 144. After the camming arms 156 are moved radially outward, the barrel 12 is inserted therein. Thereafter, by rotation of the camming wafer 144, the camming arms 156 will clamp tightly against the barrel 12. After the barrel 12 is tightly held in position by camming arms 156, wing nuts 148 are tightened to maintain the position of the camming wafer 144. By reversing the above procedure, the barrel 12 may be removed.

I claim:

1. An apparatus for measuring velocity of a projectile comprising:
   start switch means with a first side connected to ground;
   stop switch means connected to a second side of said first switch means and a source of power;
   current limiting means inserted between said stop switch means and said source of power;
   regulating means across said source of power for regulation thereof;
   meter means having a ballistic movement therein, said meter means being connected between said connection of said start and stop switch means and ground;
   said projectile first opening said start switch means to begin current flow through said meter means, subsequently said projectile traveling a predetermined distance to open said stop switch means to stop current flow through said meter means, said meter means being calibrated in velocity units.

2. The apparatus for measuring velocity as recited in claim 1 comprising a ballast means and diode means for regulating said source of power.

3. The apparatus for measuring velocity as recited in claim 1 comprising capacitor means across said meter means for charging during a time interval between opening of said start switch means and said stop switch means, said capacitor means being discharged through said meter means upon closing meter switch means.

4. A velocity measuring apparatus for determining speed of a bullet fired from a barrel of a gun, said apparatus comprising:
   structure means for mounting said barrel therein, said structure means including a plurality of clamp means and a plurality of switch mounting means, said clamp means having at least three radially extendable and retractable camming arms for opening to receive said barrel therebetween and for closing to hold said barrel therein;
   start switch means on a first of said switch mounting means and stop switch means on a second of said switch mounting means, said first and second switch mounting means being a predetermined distance apart and locating said start switch means and said stop switch means in a path of said bullet as fired from said barrel secured by said clamps;
   power source connected to said start and stop switch means;
   indicator means receiving current from said power source upon said bullet passing and activating said start switch means; upon said bullet traveling a predetermined distance to pass and actuate said stop switch means, current flow through said indicator means being terminated; said indicator means being calibrated in to give velocity of said bullet.

5. The velocity measuring apparatus of claim 4 wherein said clamp means has a rotatable portion and a stationary portion, said camming arms being pivotally mounted on said stationary portion and radially moveable on one end thereof by camming surfaces of said rotatable portion.

6. The velocity measuring apparatus of claim 5 comprising baffle means between said clamp means and said switch mounting means, said baffle means deflecting pressurized gases from said barrel upon firing said bullet therethrough.

7. The velocity measuring apparatus of claim 4 wherein said power source is regulated, said start switch means applying a gate voltage to a silicon controlled rectifier upon opening by said bullet to start conduction of said silicon controlled rectifier from said power source through said indicator means, said stop switch means terminating conduction through said indicator means upon opening by said bullet, said indicator means being a ballistic meter.

8. The velocity measuring apparatus of claim 4 comprising high input impedance amplifier means receiving a bias voltage upon charging of capacitor means by said activation of said start switch means to start conduction by said amplifier through said indicator means, said charging of said capacitor means being terminated upon said activation of said stop switch means; first means for compensating for variations in turn on voltage of same amplifier means due to temperature changes, said first compensating means being connected to an input for amplifier means; second means for compensating for variations in voltage across said amplifier means due to temperature changes, said second compensating means being connected to said power source.

9. A control circuit for a chronograph to measure velocity of a projectile for a predetermined distance comprising:
   source of regulated power;
   current limiting means in series connection with said regulated power, start switch means and stop switch means;

capacitor means in parallel connection with said start switch means, interconnection between said start and stop switch means being connected to an input for amplifier means having a high input impedance;

potentiometer means connected across said regulated power, said potentiometer providing a reverse bias on said amplifier means at a high voltage side of a wiper arm;

means for indicating conduction of said amplifier means;

said projectile means opening said start switch means to begin charging of said capacitor means and subsequently opening said stop switch means to stop charging of said capacitor means;

said wiper arm of said potentiometer means being adjustable from said high voltage side until indicating means signals beginning conduction of said amplifier means, said potentiometer having dial means calibrated in velocity units for said projectile.

10. The control circuit as given in claim 9 wherein said indicating means is a light emitting diode, said potentiometer means further comprising a correction scale for correcting velocity measurements from said dial means due to changes in temperature.

11. A control circuit for a chronograph to measure velocity of a projectile between two predetermined points along an axis comprising:

a source of power;

a first source of light shining across said axis at a first of said predetermined points;

a second source of light shining across said axis at a second of said predetermined points;

first photosensitive transistor means located opposite said axis from said first source of light and receiving light therefrom to cause conduction, said first photosensitive transistor operatively connected to first switching means which connects meter means to said source of power;

second photosensitive transistor means located opposite said axis from said second source of light and receiving light therefrom to cause conduction, said second photosensitive transistor operatively connected to second switch means across said source of power;

said projectile passing along said axis to said first predetermined point thereby causing a first shadow on said first photosensitive transistor to stop conduction therethrough which actuates said first switching means to start current flow through said meter means;

subsequently said projectile passing along said axis to said second predetermined point thereby causing a second shadow on said second photosensitive transistor to stop conduction therethrough which actuates said second switching means to stop current flow through said meter means, said meter means indicating velocity of said projectile between said first and second predetermined points.

12. The control circuit of claim 11 wherein said first and second switching means are first and second silicon controlled rectifiers, respectively, with said first and second photosensitive transistors controlling each respective gate, said meter means being a ballistic meter.

* * * * *